April 7, 1970　　　J. L. SHERIDAN　　　3,505,151
MACHINE FOR MAKING HONEYCOMB

Filed May 9, 1966　　　4 Sheets-Sheet 1

INVENTOR.
JOHN L. SHERIDAN
BY Townsend and Townsend
ATTORNEYS

April 7, 1970
J. L. SHERIDAN
3,505,151
MACHINE FOR MAKING HONEYCOMB
Filed May 9, 1966
4 Sheets-Sheet 3
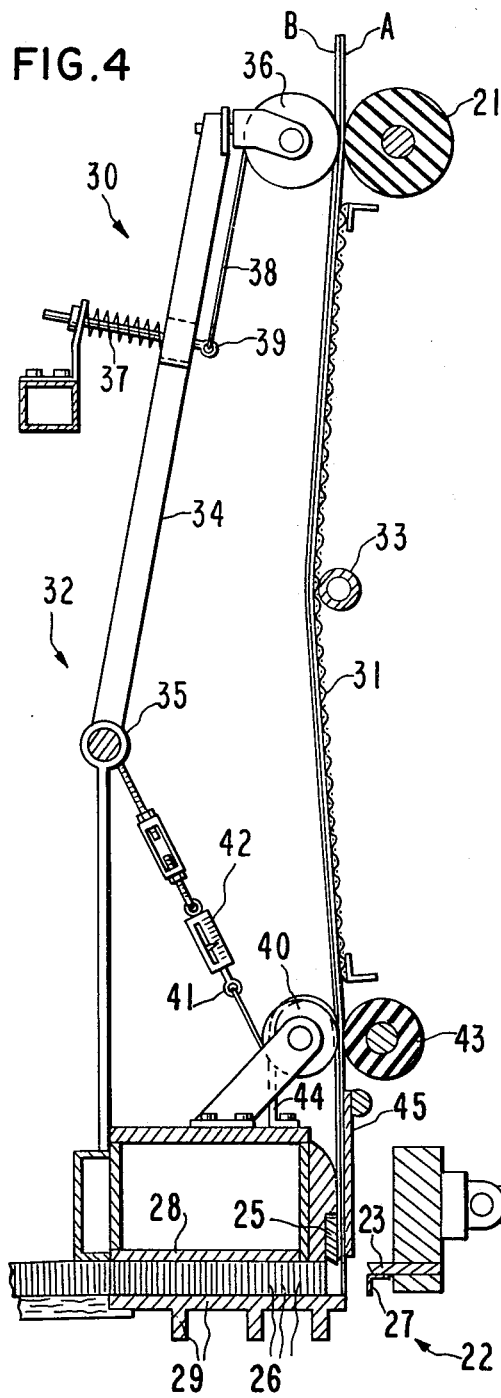
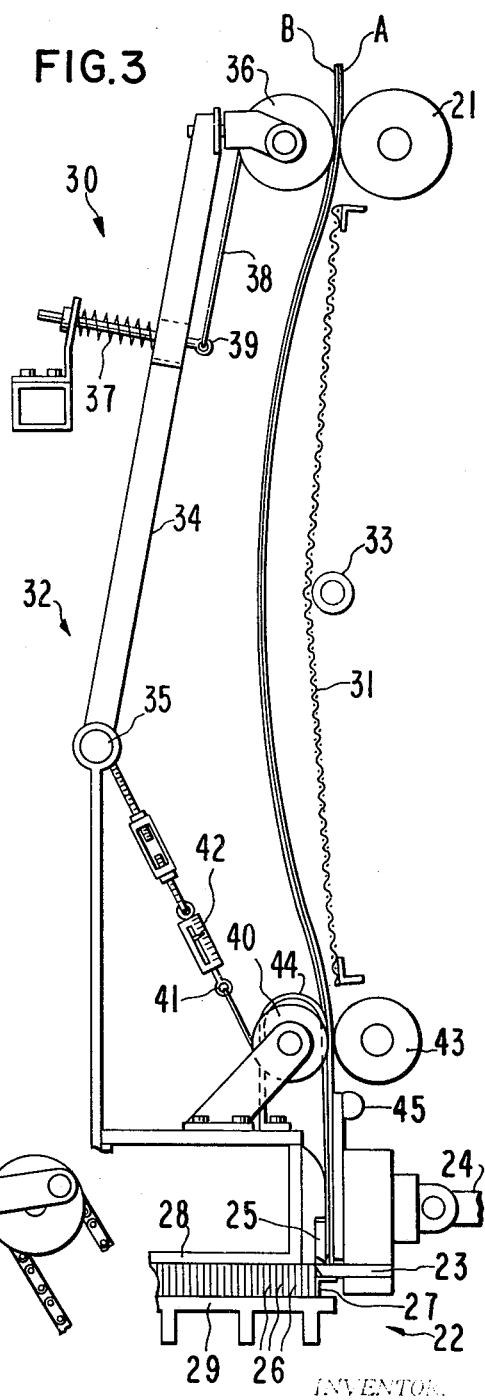
INVENTOR.
JOHN L. SHERIDAN
BY Townsend and Townsend
ATTORNEYS

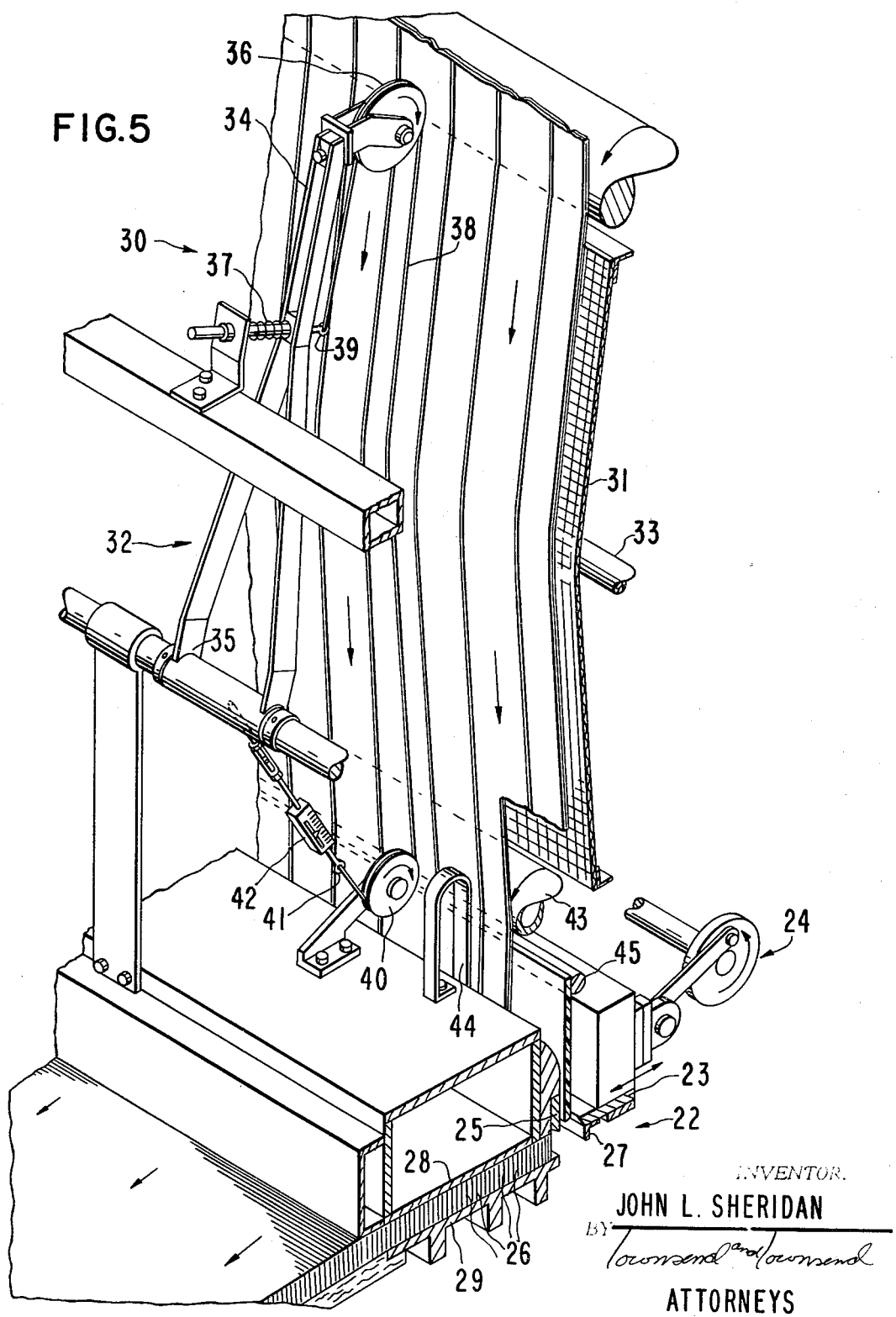

United States Patent Office 3,505,151
Patented Apr. 7, 1970

3,505,151
MACHINE FOR MAKING HONEYCOMB
John L. Sheridan, Longview, Wash., assignor to Hexcel Products Inc., a corporation of California
Filed May 9, 1966, Ser. No. 548,605
Int. Cl. B32b 31/00; F26b 11/02
U.S. Cl. 156—512                              4 Claims

ABSTRACT OF THE DISCLOSURE

A machine for the manufacture of honeycomb which includes means for applying lines of adhesive to at least one of the confronting surfaces of a pair of webs, means for curing the adhesive to bond the webs together while heating and driving the webs over a drum having a cylindrical surface, together with means for slowly rotating the drum when the web drive means is stopped including means for actuating the drum rotating means in response to stoppage of the web drive means. The machine also includes a slack accumulator having a perforated back-up member between the drive means and a cyclically operating cutter, the accumulator being arranged to take up slack in the web when its feed movement is interrupted and to feed the slack toward the cutter when the movement is not interrupted.

---

This invention relates in general to a process and machine for making honeycomb and particularly to a process and machine for making a block of material of numerous sheets bonded together which upon expansion form a honeycomb structure.

A process and machine for forming honeycomb before expansion to the desired honeycomb thickness is described in U.S. patent application Ser. No. 273,244, filed Apr. 15, 1963, entitled "Laminated Cellular Panel" by Edwin R. Hoyt and assigned to the assignee of the present invention, said application having issued as Patent 3,257,-253 on June 21, 1966. In that process and machine, the honeycomb of desired thickness is formed by transversely cutting strips of adhesive lined material from the leading end of a continuously moving web of material and packing these strips one upon another to form a pack of honeycomb before expansion. The honeycomb can be manufactured of any desired material which can be provided in continuous webs and typically at least a pair of webs are directed through the machine with a set of longitudinally extending adhesive lines provided on one of the confronting surfaces of the pair of webs and a second set of longitudinally extending lines on at least one of the non-confronting surfaces of the pair of webs in staggered relation to the first set of adhesive lines.

In order to obtain a structurally sound block of honeycomb before expansion, the strips cut from the moving webs must be adhered together all along each of the adhesive lines. If such a bond is not produced, flaws will result in the resultant honeycomb such as deformed cells or areas where cells do not exist. It is also important that the length of each strip of material cut from the leading end of the webs be uniform so that the honeycomb is of uniform thickness and can be utilized immediately upon expansion after formation in the machine. For example, one use of this type of honeycomb is for the core in panel construction wherein the cells of the honeycomb are oriented with their axes perpendicular to a facing sheet.

The object of the present invention is to provide a honeycomb manufacturing process and machine which will produce honeycomb material before expansion having greater uniformity in all respects and higher quality than cellular panels heretofore produced.

One aspect of the present invention is the provision of a process and machine for producing honeycomb wherein a pair of webs are adhesive lined on at least one of their confronting surfaces and brought together and drawn around an arcuate path under traveling tension and applied heat whereby the webs of material are adhered to one another all along the lines of adhesive. This process and machine avoids the creation of a bubble between the joined webs which would result in delamination of the webs and a defect in the honeycomb upon expansion. Another advantage of this process and machine just described lies in the fact that since the adhesive utilized to bond the alternate pair of webs of material together is cured before the strips of material are cut from the leading end of the web, and the other exposed alternate adhesive lines joining the succeeding alternate pair of webs on the leading end of the material is partially set by virtue of being applied to warm material, the amount of wet or non-cured adhesive is maintained at a minimum thereby preventing excessive build-up of adhesive on the cutting members which could disrupt the uniformity of the cut.

In accordance with another aspect of the present invention, the arcuate surface around which the webs of material are drawn for joining together and allowing the adhesive to complete its initial set is a portion of the cylindrical surface of an idling drum rotated in response to movement of the webs and including the provision for slowly rotating the drum when the webs are stopped. This construction and process avoids slippage between the contacting web and arcuate surface that might cause excessive wear as well as tend to create delamination during the normal continuous movement of the web while allowing during a stoppage of the web for rotation of the drum thereby to avoid absorption of a great deal of heat by the laminating drum that might cause warpage.

Another aspect of the present invention is the provision of a slack accumulator assembly between the drive mechanism for the continuously moving web and the cutting assembly in which all of the slack is taken out of the web before each cut is commenced so that the length of the strip cut will always be the same. In accordance with this aspect of the present invention, the slack accumulating assembly includes a perforated back-up member for defining the position of the web when the cutter begins the cutting phase of its cycle so that air is not trapped between the web and the back-up member when the accumulated slack in the web is snapped out. Air trapped between the web and back-up member results in a non-uniform spacing of the web and back-up member at the end of successive slack accumulations and thus a non-uniform length of web material driven past the cutter for severance into a strip of material.

Other objects and advantages of this invention will become apparent when reading the following description and referring to the accompanying drawings in which similar characters of reference represent corresponding parts in each of the several views.

In the drawings:

FIG. 3 is an enlarged side view of the slack accumulator assembly of the structure shown in FIG. 1 with the cutting assembly positioned part way through the cutting cycle with a certain amount of slack accumulated in the web;

FIG. 4 is a view similar to FIG. 3 but with the cutting assembly positioned ready for initiation of the cutting operation and with all previously accumulated slack taken out of the web;

FIG. 5 is a perspective view of a portion of the structure illustrated in FIG. 4;

Figure 1:
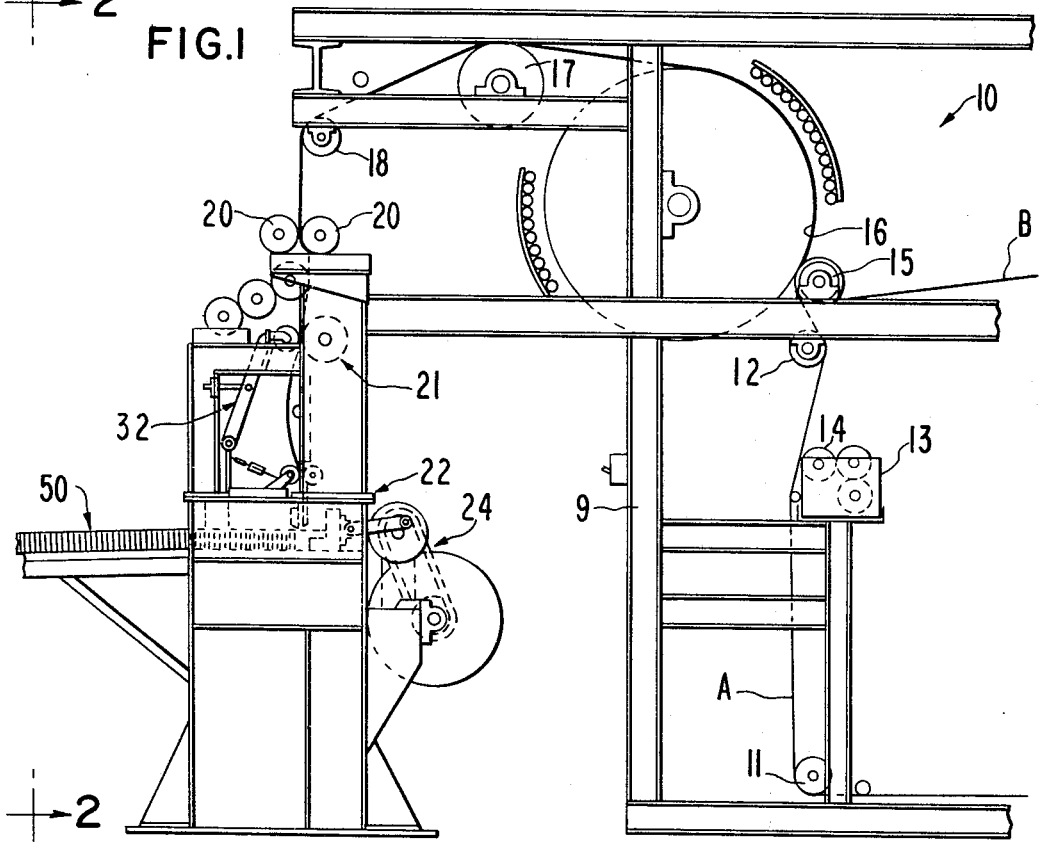
FIG. 1 is a side elevational view of a honeycomb manufacturing machine incorporating features of the present invention.
Figure 2:
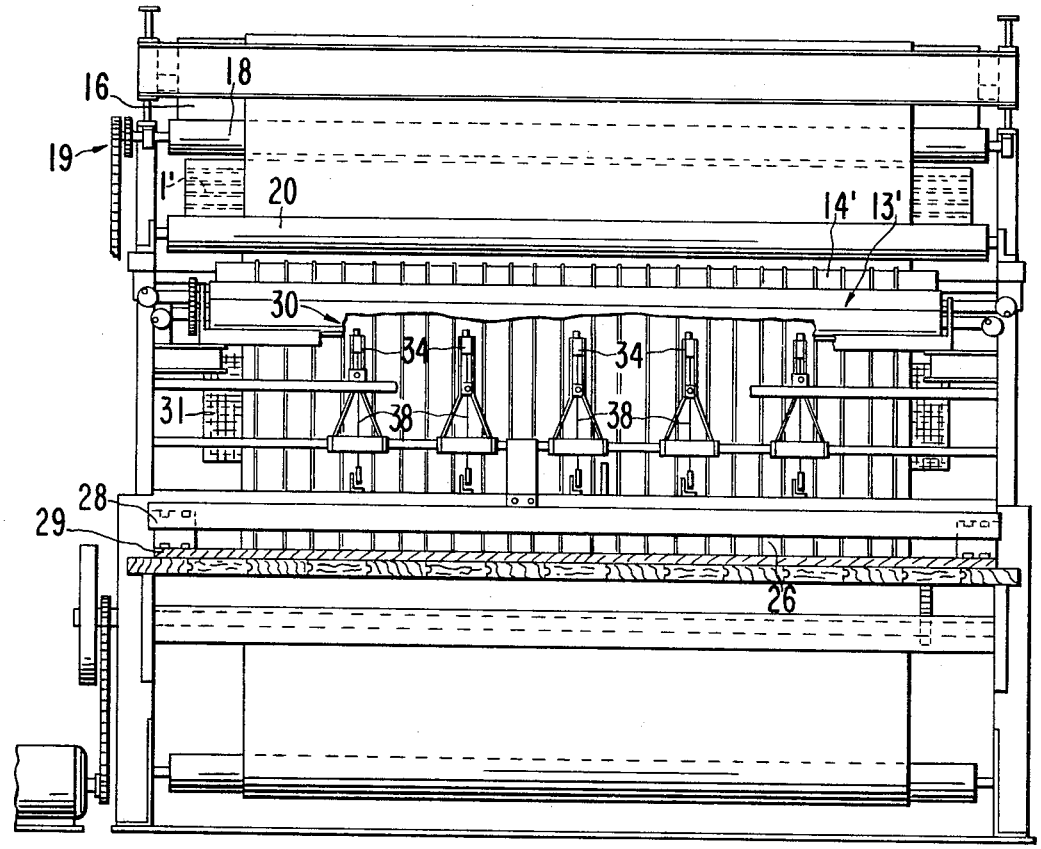
FIG. 2 is an end elevational view, partially broken away, of the structure shown in FIG. 1 taken along line 2—2 in the direction of the arrows.

Referring now to the drawings with particular reference to FIGS. 1 and 2, there is illustrated a honeycomb manufacturing machine in accordance with the present invention wherein first and second webs A and B respectively, drawn from unwind strands (not shown) are carried along a frame 9 successively through an adhesive applicator and curing assembly 10, a drive assembly 20, an auxiliary drive 21, a slack accumulator assembly 30 and a cutting and packing assembly 22. While the present invention applies to the manufacture of honeycomb utilizing two or more webs of material which are bonded together and then cut to form the pack of honeycomb before expansion, the invention will be described by way of illustration as applied to the manufacture of honeycomb using just the pair of webs A and B.

The web A is drawn through the machine over guide rollers 11 and 12 between which is located an adhesive application assembly 13 which includes a roller 14 of any one of a variety of constructions adapted to apply longitudinally extending lines of adhesive on the surface of the web A that is to confront a surface of the web B. The adhesive lined web A is trained around a guide roller 15 at which it is joined with web B and drawn around a laminator roll 16, over a guide roll 17, a guide roll 18, through drive rolls 20, over the adhesive applicator roll 14' of a second adhesive applicator assembly 13' and past an auxiliary drive roll 21. The adhesive applicator assembly 13' applies a second set of adhesive lines on the non-confronting surface of web B staggered with respect to the adhesive lines joining the confronting surfaces. The tension of the webs A and B and their traveling pattern around the guide rolls 15 and 17 cause the webs to be pressed together while traveling around the arcuate surface of laminator roll 16. While the webs are being pressed together, heat may be applied to the webs such as by lamp banks L and L' externally of the roll 16 or by steam internally of roll 16 for curing of the adhesive to bond the webs together. In order to avoid excessive friction between the laminator roll 16 and web A which would produce undesired wear and tend to stretch web A and not web B, laminator roll 16 is normally an idling roll which is turned by the webs being drawn thereover. However, a drive mechanism 19 (see FIG. 2) is connected through an overriding clutch to the laminator roll 16. The overriding clutch allows the relatively fast traveling webs to turn the roll during normal continuous movement of the webs and the drive mechanism 19 to turn the roll 16 when the web is stopped. On certain occasions the machine will be stopped for adjustment or reloading and on such occasions if there is no web on the laminator roll 16 it is usually desired to leave the lamp banks L and L' turned on to avoid their warm up time upon again initiating movement of the webs. Under such circumstances the laminator roll 16 would absorb a great amount of heat at the areas on its circumference immediately adjacent the lamp banks L and L' and such heat absorption would result in warpage of the drum if the drive 19 did not rotate the roll 16. To prevent the laminator roll from driving the web, a relay switch is provided which pulls the roll 15 away from the roll 16 when the movement of the web stops. Another relay switch turns off the lamp banks L and L' to prevent overheating of the web. When the machine is again started to initiate movement of the webs A and B, the drive apparatus 19 is disconnected from the roll 16 by the overriding clutch.

If the adhesive does not require heat then the heating elements and the drive apparatus 19 may be omitted.

After the two webs have been joined by adhesive at their confronting surfaces and coated with adhesive lines on one of the non-confronting surfaces, the pair of webs is fed from the auxiliary drive roll 21 to the cutting assembly 22 where a movable sheer blade 23 driven by a crank assembly 24 performs three functions. First, the movable blade 23 in conjunction with a fixed blade 25 rigidly mounted to the frame transversely cuts strips of material 26 to the desired thickness dimension for the honeycomb (see FIGS. 6 and 7) from the leading end of the webs. Secondly, in conjunction with a packer bar 27 attached thereto, the blade 23 packs the just cut strips 26 into a packer throat defined by upper and lower plates 28 and 29 to adhere the cut, previously adhered strips of material to the previously cut strips to make up the pack of honeycomb before expansion. Thirdly, when the cut is initiated, the upper surface of the movable blade 23 stops downward travel of the combined webs A and B during the cutting operation.

During the cutting portion of the cycle when downward travel of the combined webs is prevented, the slack accumulated between the auxiliary drive roll 21 and the cutting blade 23 causes the web to bow or ripple in the slack accumulator assembly 30. This accumulator assembly 30 includes a back-up member 31 secured to the frame 9 and defining the position for the web when the cutter begins its cutting cycle and a compression assembly located on the opposite side of the webs A and B from the back-up member 31 for snapping the webs back against the back-up member 31 when the movable blade 23 is withdrawn to permit downward movement of the webs. The back-up member is provided with apertures for passage of air therethrough and preferably is in the form of a screen. This construction avoids the build up or entrapment of air between the joined webs A and B and the back-up member 31 as the webs snap back against the back-up member. If the webs are not exactly positioned against the back-up member 31 when the movable blade 23 begins to cut the leading end of the webs, the precise amount of material will not be cut from the leading end of the web and therefore the honeycomb pack that will be produced will not have a uniform thickness. As shown in the drawing, a support member 33 is located centrally of the screen back-up member 31 between the ends of the screen that are mounted to the frame for producing a convex surface on the side of the back-up member 31 facing the webs A and B. It has been found that this convex surface promotes a single ripple or bubble in the webs centrally thereof which permits rapid flattening of the webs when the accumulated slack is taken out of the webs to flatten the webs against the back-up member 31.

The compression assembly 32 includes a plurality of arms 34 each bifurcated and rotatably mounted at one end 35 on the frame and provided on its opposite end with a peripherally grooved disc 36 which is urged toward the auxiliary drive roll 21 against the webs A and B between lines of adhesive by a compression spring 37 applying pressure to the arm 34 between its ends. A slack accumulating and removing wire 38 secured at its one end 39 to the arm 34 passes around the disc 36, extends longitudinally of the webs A and B on the opposite side thereof from the back-up member 31, passes around a lower peripherally grooved disc 40 and has its other end 41 connected to a tension spring 42.

A friction roll 43 is mounted on the frame on the opposite side of the webs from the grooved discs 40 and are spaced from the discs 40 a distance slightly greater than the thickness of the combined webs. This friction roll 43 can be driven at a speed greater than the lineal speed of the paper to aid in movement of the webs into the packing throat, During the cutting portion of the cycle, the slack accumulated between the auxiliary drive roll 21 and the cutting blade 23 causes the joined webs A and B to bow or ripple away from the back-up plate 31. The webs carry the spring mounted wires 38 with them so that the bow or ripple in the webs is under compression from the wires. As soon as the movable blade 23 is retracted from the fixed blade and the webs A and B are free to advance into the throat between plates 28 and 29, the spring tensioned wires 38 snap the web back against the back-up member 31 to take all slack out of the webs and to drive the leading end of the webs past the movable blade until the end of the webs hits the lower plate 29 of the packing throat. It has been found that without perforations in the back-up member 31 air is trapped between the web and the solid backing plate shown in the earlier Hoyt application referenced above. By replacing the solid back-up plate with a screen, it was discovered that the webs would always be snapped back flatly against the back-up plate to advance an equal amount of web material past the cutting edge of the movable blade for cutting strips 26 of uniform dimensions.

Figures 6, 7:
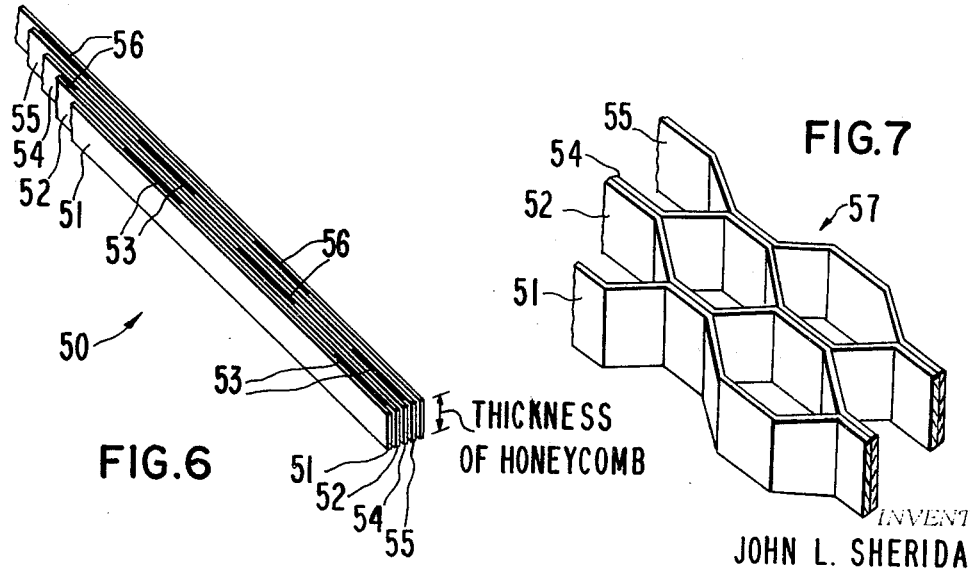
FIG. 6 is an enlarged perspective view of a portion of a pack of honeycomb before expansion produced with the present invention.
FIG. 7 is a perspective view showing a portion of the pack illustrated in FIG. 6 in expanded form.

FIG. 6 illustrates a portion of a pack 50 of honeycomb before expansion produced in accordance with the present invention. As shown there, a first pair of strips 51 and 52 initially bonded together along spaced apart adhesive lines 53 in the adhesive applicator and curing assembly 10 are bonded to the next pair of strips 54 and 55 by adhesive lines 56 applied to the webs A and B at the adhesive applicator assembly 13'. This set of adhesive lines 56 is staggered with respect to the lines 53 and is cured when the strips are held under pressure in the throat immediately following the cutting operation. When a pack 50 of material as shown in FIG. 6 is expanded in any conventional manner such as with fast moving endless belts contacting the top and bottom surfaces of the pack as described in the above referenced Hoyt application, expanded honeycomb 57 as shown in FIG. 7 is produced.

In certain instances such as when utilizing four webs of stiff material of, for example, heavy paper or aluminum, and when the thickness of the honeycomb is relatively small, the webs will be sufficiently rigid to snap out the slack accumulated during a cutting cycle so that few or no compression wires need be utilized.

By utilization of the present invention, a continuous cellular structure of great uniformity and high quality can be produced in the desired thickness required for any application such as for use as a core material in a panel such as a door, bulkhead or the like.

Although the foregoing invention has been described in some detail by way of illustration and example for purposes of clarity of understanding, it is understood that certain changes and modifications may be practiced within the spirit of the invention as limited only by the scope of the appended claims.

What is claimed is:

1. A machine for manufacture of cellular laminate comprising: means for feeding at least a pair of webs in registry; means for applying lines of adhesive to at least one of the confronting surfaces of said pair of webs, means for curing the adhesive to bond said webs to one another; means for driving said webs through said curing means, said curing means including a drum having an arcuate surface thereon, guide means for guiding said pair of webs around said arcuate surface in response to tension on the webs from said driving means thereby to press the webs together, means for directing heat to said webs at a portion only of said arcuate surface to bond said webs together, said drum being rotated by movement of said webs responsive to said drive means, means for slowly rotating said drum when said drive means is stopped to avoid nonuniform heating of the drum, and means for actuating said rotating means responsive to stoppage of said drive means.

2. A machine for making honeycomb comprising a cyclically operating cutter arranged to cut transverse strips from a continuous web of material, continuous feed means arranged to feed the web toward said cutter, said cutter having a phase in its cycle of operation which interrupts the feed movement and a phase which permits such feed movement, a slack accumulator between said feed means and said cutter arranged to take up slack in the web when its feed movement is interrupted and feed said slack to the cutter when the feed movement is not interrupted, said slack accumulator including a back up member defining the position for said web when said cutter begins said phase of its cycle which interrupts the feed movement said back up member provided with apertures for passing air whereby said web lies flat against said member in said position, at least one resilient slack loop urging member positioned on the opposite side of the web from said back up member for permitting accumulation of slack in said web in a direction away from said back up member and tending to flatten said web against said back up member.

3. The machine in accordance with claim 2 wherein said back up member is a screen.

4. A machine for the manufacture of honeycomb comprising, in combination, means for feeding at least a pair of webs in registry; means for applying lines of adhesive to at least one of the confronting surfaces of said pair of webs; means for curing the adhesive to bond said webs to one another; means for driving said webs through said curing means; said curing means including a drum having a cylindrical surface, at least a pair of guide rollers having their longitudinal axes aligned parallel to the axis of said drum and located with respect to said drum to guide said pair of webs around a portion of the surface of said drum in response to tension on the webs from said drive means thereby to press the webs together, means for directing heat to said webs at said portion of the cylindrical surface of said drum, said drum being rotated by movement of said webs responsive to said drive means, means for slowly rotating said drum when said drive means is stopped, and means for actuating said rotation means responsive to stoppage of said drive means; means for applying spaced apart lines of adhesive to at least one of the non-confronting surfaces of said joined pair of webs in staggered relation to said adhesive lines; a cyclically operating cutter arranged to cut transverse strips from said joined pair of webs, said cutter having a phase in its cycle of operation which interrupts the feed movement from said drive means and a phase which permits such a movement, a slack accumulator between said drive means and said cutter arranged to take up slack in the web when its feed movement is interrupted and to feed said slack to the cutter when the movement is not interrupted, said slack accumulator including a back up screen member defining the position for said joined pair of webs when said cutter begins said phase of its cycle which interrupts the feed movement, at least one resilient slack loop urging member positioned on the opposite side of the web from said back up member for permitting accumulation of slack in said web in a direction away from said screen member and tending to flatten said web against said screen member.

References Cited

UNITED STATES PATENTS

| | | | |
|---|---|---|---|
| 2,995,970 | 10/1960 | Rice et al. | 117—64 XR |
| 3,257,253 | 6/1966 | Hoyt | 156—256 |
| 3,330,717 | 7/1967 | Roullard | 156—548 |

HAROLD ANSHER, Primary Examiner

H. F. EPSTEIN, Assistant Examiner

U.S. Cl. X.R.

34—110; 100—93; 156—548